३,००७,८८७
WATER-SOLUBLE SALT OF A POLYMER AND METHOD OF PREPARING AN AQUEOUS SOLUTION THEREOF
Henry J. Essig, Westlake, Ohio, assignor to The B. F. Goodrich Company, New York, N.Y., a corporation of New York
No Drawing. Filed July 21, 1958, Ser. No. 749,594
13 Claims. (Cl. 260—29.6)

This invention relates to novel water-soluble, thermosetting polymers and more particularly pertains to mechanically stable, thermosetting water-soluble interpolymers of alpha-beta olefinically unsaturated carbonyl monomers, the strong, insoluble, flexible films which result from curing said interpolymers and to the methods for preparing said interpolymers.

Interpolymers of N-methylol acrylic amide monomers, such as N-methylol acrylamide and N-methylol methacrylamide, with other vinyl monomers are known in the art. Many of the previously disclosed polymers of this type have been described as water-soluble and curable with heat and catalysts. Many of the aqueous solutions of these curable polymers have been described as unstable in that they tend to set to gels on prolonged aging and are subject to severe breakdown when sheared mechanically. The N-methylol acrylic amide interpolymers of the water-soluble types known in the art have been composed of relatively high proportions of the methylol amide or other similar monomers functioning to impart water solubility to the polymer. Films cast and cured from such aqueous systems generally require a catalyst and are described as water-insoluble, hard and brittle. The brittleness is generally caused by the presence of the high levels of hydrophilic groups in the polymer and the corresponding high degree of cure necessary to insolubilize the films. Because of the brittleness inherent in these water-soluble, thermosetting polymers of the prior art they have found their greatest utility as coating agents for rigid surfaces where good elongation and toughness is not required.

Accordingly, it is an object of the present invention to provide new water-soluble thermosetting interpolymers which form mechanically stable aqueous solutions which are easily pourable and sprayable even at high polymer concentrations. Another object is to provide thermosetting interpolymers which contain controlled amounts of hydrophilic groups and curable N-methylol amide groups so as to impart water-solubility and stability in certain pH ranges and complete insolubility upon drying and heating in the absence of added catalyst with a minimum of cross-linking. Still another object of this invention is the provision of thermosetting, water-soluble interpolymers curable to non-blocking, tough, flexible films having high pigment binding capacity. It is yet another object of this invention to provide a method for preparing said thermosetting, water-soluble interpolymers and salts thereof. These and other objects and advantages of the present invention will become more apparent to those skilled in the art from the following detailed description and examples.

I have discovered a polymeric composition conforming to the structure

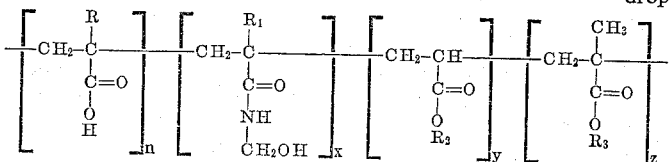

wherein R and $R_1$ each represents hydrogen and methyl; $R_2$ represents methyl, ethyl, propyl and butyl; $R_3$ represents methyl and ethyl; $n$ represents from 3 to 12 weight percent based on the combined weight of $x$, $y$ and $z$; $x$ represents from 8 to 25 weight percent based on the combined weight of $n$, $y$ and $z$; $y$ represents from 45 to 89 weight percent based on the combined weight of $n$, $x$ and $z$; $z$ represents from 0 to 44 weight percent based on the combined weight of $n$, $x$ and $y$; the sum of the numerical values of $n+x+y+z$ is always 100 and the groups $n$, $x$, $y$ and $z$ are present in the polymer in a heterogeneous relative order.

The polymers embodied in this invention are those compositions comprising from 45 to 89 parts by weight of a lower acrylic acid ester, from 0 to 44 parts by weight of a lower methacrylic acid ester, from 3 to 12 parts by weight of an alpha-beta olefinicially unsaturated carboxylic acid having a terminal $CH_2=C<$ group and having from 3 to 4 carbon atoms and from 8 to 25 parts by weight of an N-methylol alpha-beta olefinically unsaturated carboxylic acid amide having a terminal $CH_2=C<$ group and having from 4 to 5 carbon atoms.

The lower acrylic acid esters useful in this invention include those in which $R_2$ in the above formula is an aliphatic hydrocarbon group having from 1 to 4 carbon atoms such as methyl acrylate, ethyl acrylate, n-propyl acrylate, isopropyl acrylate, n-butyl acrylate, isobutyl acrylate and secondary butyl acrylate. The most preferred lower acrylic acid esters are methyl acrylate and ethyl acrylate. The lower acrylate acid esters are useful in the range of from about 45 to about 89 weight percent based on the weight of the other monomers.

The lower methacrylic acid esters useful in this invention include those in which $R_3$ in the above formula is an aliphatic hydrocarbon group having from 1 to 2 carbon atoms such as methyl methacrylate and ethyl methacrylate. The preferred methacrylic acid ester is methyl methacrylate. The lower methacrylic acid esters are useful in the range of from about 0 to about 44 weight percent based on the weight of the other monomers.

The alpha-beta olefinically unsaturated carboxylic acids embodied in this invention include acrylic acid and methacrylic acid. The alpha-beta olefinically unsaturated carboxylic acids are useful in the range of from about 3 to about 12 weight percent based on the weight of the other monomers.

The N-methylol acrylic amides embodied in this invention include N-methylol acrylamide and N-methylol methacrylamide. The most preferred N-methylol acrylic amide is N-methylol acrylamide. The N-methylol acrylic amides are useful in the range of from about 8 to about 25 weight percent based on the weight of the other monomers.

The water-soluble thermosetting interpolymers of this invention are most conveniently prepared from a batch charge of the monomers in an excess of a substantially anhydrous lower aliphatic monohydric alcohol such as methanol, ethanol, n-propanol, iso-propanol and the butanols at a temperature of from about 50° C. to about 100° C. in the presence of from about 0.25 to about 2 parts by weight of a free radical polymerization initiator such as acetyl benzoyl peroxide, peracetic acid, hydroxyheptyl peroxide, isopropyl percarbonate, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobisisobutyronitrile, the so-called redox and heavy metal polymerization initiators and the like and others. The polymerization process embodied in this invention may also be initiated by the use of nuclear radiation, X-rays, ultra-violet rays and ultrasonic waves. The polymers of this invention are made in high conversion, usually in excess of 80% conversion and often as high as from 95 to 100%. The polymerizations can be carried out at reflux, in a closed container under autogenous pressure, or under artificially induced superatmospheric or subatmospheric pressures preferably in an oxygen-free atmosphere.

The polymers are converted from alcohol solutions to water solutions by the addition of water and a neutralizing agent such as ammonia, a hydrazine or a low-boiling amine to the alcoholic solution of polymer followed by an azeotropic distillation which removes last traces of the alcohol and the excess neutralizing agent. The final aqueous solution of polymer salt is preferably in the range of pH 5–8 and more preferably in the range of pH 6–7 with a total solids content of from about 2 to about 40 percent by weight and preferably from about 5 to about 30 percent by weight of polymer in water.

The polymers of this invention can be insolubilized by a heat cure at a temperature of from about 100° C. to about 180° C. Generally a cure cycle of 5 minutes at 160° C. is sufficient to produce an essentially insoluble polymer. It is generally preferred, however, to give the water-soluble polymer a cure cycle of from 30 minutes to one hour at about 160° C. to insure complete insolubility and complete alkali insensitivity. The mechanism of the cure is not understood but is believed to involve the activity of both the N-methylol groups and the carboxylate groups present in the polymer. The fact that it is not necessary that a catalyst be used during the cure operation further distinguishes the polymers of the present invention from those of the prior art.

The polymers embodied in this invention are useful for the impregnation, coating, and dyeing of woven fabrics and non-woven fabrics, they are useful in the manufacture of papers and water based paints and they serve as pigment binders, primers and protective coatings for sheet metals especially those which undergo some flexing or bending such as food and beverage containers and the like.

In the following illustrative examples the amounts of ingredients are given in parts by weight unless otherwise specified.

Example I

A glass lined reaction vessel was charged with 20 g. of glacial acrylic acid, 42.5 g. of N-methylol acrylamide, 93.75 g. of ethyl acrylate, 93.75 g. of methyl methacrylate, 400 ml. of isopropyl alcohol and 1.25 g. of caprylyl peroxide. The polymerization reaction was carried out at the reflux temperature for 16 hours. The resulting alcoholic solution of polymer was treated with an equal volume of water and slightly more than the amount of ammonium hydroxide theoretically necessary to neutralize the carboxyl groups present in the polymer. The water-isopropyl alcohol azeotrope was distilled from the mixture and additional water was added to the pot from time to time so that the final alcohol free aqueous solution has the desired polymer concentration. This procedure causes a disruption of the stoichiometric balance between the carboxyl groups and the ammonium hydroxide because of the irreversible removal of some of the ammonia during the distillation so that the final product generally has a pH of about 7. If the aqueous solution of polymer is made more alkaline, in the range of pH 9 or 10, an almost unpourable product is obtained. If insufficient ammonia is present, true solution is not achieved and the polymer settles out. It is generally desirable to carry out the alcohol removal in the above manner in such a fashion that a 25% solids solution of polymer in water having a pH of from 6 to 7 is obtained. Primary and secondary aliphatic amines such as methyl amine, ethyl amine, dimethyl amine, hydrazine and others were used in place of ammonia in the foregoing neutralization step and N-methylol methacrylamide was used in place of N-methylol acrylamide with comparable results.

Viscosities for a 2% aqueous solution of the polymer described above were determined in a Cannon-Fenske viscometer, size 100, at 25° C. Relative viscosity, specific viscosity and percent decrease in relative viscosity with time of shear are given below. The term $t_0$ is the flow time for distilled water in the viscometer at 25° C.

| Shear Time, Min. | Flow Time, Seconds, $t$ | Relative Viscosity, $t/t_0$ | Specific Viscosity, $t/t_0-1$ | Percent Decrease in Viscosity |
|---|---|---|---|---|
| 0 | 226.7 | 3.22 | 2.22 | |
| 1 | 220.5 | 3.13 | 2.13 | 2.8 |
| 2 | 213.7 | 3.03 | 2.03 | 5.9 |
| 5 | 202.8 | 2.89 | 1.89 | 10.1 |
| 10 | 197.8 | 2.80 | 1.80 | 12.9 |
| 15 | 193.5 | 2.75 | 1.75 | 14.6 |
| 20 | 190.0 | 2.70 | 1.70 | 16.3 |

The polymer is quite stable to the vigorous shearing produced. The stability increases for higher concentrations of the polymer in water. The aqueous solutions of the above-described polymer do not freeze at 0° C. and when they are frozen at Dry Ice temperatures and allowed to thaw no noticeable change occurs in the physical properties of the solution.

A film of the polymer prepared in the above manner was cast on a glass sheet and was cured for 30 minutes at 160° C. The resulting cured film was clear. It was completely insoluble both in water and in a 5% aqueous solution of trisodium phosphate.

The 25% aqueous solution of the acrylic acid-N-methylol acrylamide-ethyl acrylate-methyl methacrylate interpolymer was cast on a polyethylene sheet with a Bird applicator and the resulting film was air dried for 16 hours followed by currying at 160° C. for 2 minutes. The cured film had a tensile strength of 525 p.s.i. and a tear strength of 33.5 g./inch.

A 9″ x 12″ sheet of a 50:50 polyethylene terephthalate-wood pulp paper was saturated with a 10% aqueous solution of the polymer described above. The paper sheet was then run through a padder sheet and was allowed to air dry. The dried paper, which had a 15% polymer pickup, was cured at 160° C. for 30 minutes and the product was found to have a dry tensile strength of 20 p.s.i., a wet tensile strength of 27 p.s.i., an elongation of 5% and a tear strength of 19 pounds per inch. The properties of the polymers prepared in the foregoing manner in which N-methylol methacrylamide was substituted for N-methylol acrylamide were similar to the properties of the polymers described above.

Example II

An interpolymer of 86 parts of ethyl acrylate, 4 parts of acrylic acid and 10 parts of N-methylol acrylamide was prepared in ethanol and converted to a 25% aqueous ammonium salt solution by the method described in Example I. A film of this interpolymer was cast on polyethylene with a Bird applicator and air dried for 16 hours. The resulting water-insoluble film was cured at 160° C. for 15 minutes and it was found to have a tensile strength of 1352 p.s.i., an elongation of 253% and a tear strength of 68.9 g. per inch. The resulting solution was used to impregnate a non-woven fleece consisting of 50 parts of nylon and 50 parts of a mixture of cotton and rayon. Excess binder was removed by passing through a two roll padder and the samples were dried on a photoprint dryer. The impregnated fabric was cured for 5 minutes at 300° F. The resulting fabric had a higher tensile strength at 30% polymer pickup than a similar fabric treated with commercial butadiene-acrylonitrile latex binder at 90% polymer pickup and was more water and alkali resistant than a commercial polyvinyl acetate latex binder. The cured, non-woven fabric treated with the water-soluble polymers of this invention possess excellent washability and dry cleanability (see below) in addition to nondiscoloration in both heat and fadeometer aging. Good strength, resilience and hand were obtained and the non-woven fabrics of this type were found to be less soil retentive than non-woven fabrics treated with the conventional latex binders.

| Dry Cleaning Solvent | Area Change (Percent) | |
|---|---|---|
| | Butadiene-Acrylonitrile Latex Binder | Water-Soluble Polymer |
| Perchloroethylene | gel | 0 |
| Trichloroethylene | dissolved | 62 |
| Stoddard Solvent | 0 | 0 |

Similar properties were observed for the polymers prepared in the above-described manner in which methyl acrylate, propyl acrylate and butyl acrylate were substituted for ethyl acrylate, and N-methylol methacrylamide was substituted for N-methylol acrylamide.

*Example III*

An interpolymer of 52.5 parts of ethyl acrylate, 22.5 parts of methyl methacrylate, 17 parts of N-methylol acrylamide and 8 parts of acrylic acid was prepared in ethanol and converted to an aqueous ammoniacal salt solution in the manner described in Example I. A 50:50 weight percent polyethylene terephthalate-wood pulp paper was treated with a 10% aqueous solution of this polymer by the procedure described in Example I. The cured paper had a wet tensile strength of 25 p.s.i. and a dry tensile strength of 19 p.s.i.

*Example IV*

An interpolymer of 75 parts of ethyl acrylate, 8 parts of acrylic acid and 17 parts of N-methylol acrylamide was prepared in n-butanol and the product was converted to an aqueous solution by the procedure described in Example I. A film of this polymer was made on a polyethylene sheet and the dry film was cured for 2 minutes at 160° C. to give a cured product having a tensile strength of 2064 p.s.i., an elongation of 200% and a tear strength of 188.8 g. per inch.

*Example V*

An interpolymer of 52.5 parts of ethyl acrylate, 22.5 parts of methyl methacrylate, 8 parts of acrylic acid and 17 parts of N-methylol acrylamide was prepared in ethanol and was converted to a 5% aqueous ammoniacal solution by the procedure described in Example I. A paper board stock was coated with the 5% aqueous solution of polymer and the coated paper board was cured at 325° F. for 15 minutes. The treated board was then cut into one inch squares and sets of squares were placed face-to-face under 1, 2 and 4 pound weights in an oven at 120° F. for 16 hours. No evidence of blocking was observed in any of the samples at the end of this period. The polymers of this invention are excellent impregnating agents for paper beverage cups particularly those used for serving hot drinks.

*Example VI*

The 25% aqueous polymer solution described in Example I was mixed in a 100:70 weight ratio of dry polymer to titanium dioxide pigment (Titanox RA) on an ink mill. The resulting concentrate was diluted to a sprayable viscosity with water and was sprayed on both primed and bare steel panels and the treated panels were baked at 325° F. for 30 minutes. The baked panels withstood 10 weeks' immersion in water and they had 60° gloss of greater than 85 and a Sward rocker hardness of about 25. The panels also passed 100 hour fadeometer testing at 190° F. Excellent adhesion to various metals such as steel, aluminum and tin plate was noted for the polymers of this invention. The coated and baked panels could be flexed and bent without noticeable cracking or chipping of the cured polymeric surface film.

*Example VII*

A textile print paste was prepared with a soluble ammonium salt of an interpolymer of 64.5 percent ethyl acrylate, 21.5 percent methyl methacrylate, 4 percent acrylic acid and 10 percent N-methylol acrylamide which was prepared by the method given in Example I. The print paste formulation was composed of 100 parts of a Stoddard solvent in water emulsion, 10 parts of a 25% pigment-in-oil dispersion and 10 parts of the water-soluble polymer described above. The print paste composition was coated on a piece of woven cotton fabric and the treated fabric was given a 30 minute cure at 325° F. The resulting fabric was subjected to a 1 week fadeometer test with no noticeable change in color intensity. The dyed fabric stood up well in dry cleaning and launderometer tests showing excellent wet and dry crock in both instances.

The embodiments of the invention in which an exclusive property or privilege is claimed are defined as follows.

I claim:

1. The salt of (1) a polymer having the structure

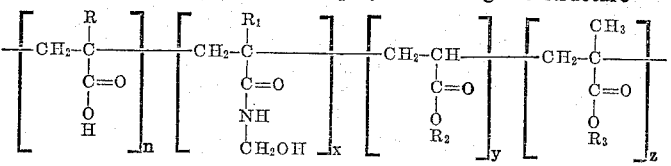

wherein R and $R_1$ are members of the group consisting of hydrogen and methyl; $R_2$ is a member of the group consisting of methyl, ethyl, propyl and butyl; $R_3$ is a member of the group consisting of methyl and ethyl; $n$ represents from 3 to 12 weight percent based on the combined weight of $n$, $x$, $y$ and $z$; $x$ represents from 8 to 25 weight percent based on the combined weight of $n$, $x$, $y$ and $z$; $y$ represents from 45 to 89 weight percent based on the combined weight of $n$, $x$, $y$ and $z$; $z$ represents from 0 to 44 weight percent based on the combined weight of $n$, $x$, $y$ and $z$; the sum of the numerical value of $n+x+y+z$ is always exactly 100 and the groups $n$, $x$, $y$ and $z$ are present in a heterogeneous relative position and (2) a member of the group consisting of ammonia, hydrazine, a low boiling primary aliphatic amine and a low boiling secondary aliphatic amine said salt being soluble in water in the pH range of from about 5 to about 8.

2. The salt of claim 1 wherein $n$ is 8, $x$ is 17, $y$ is 37.5 and $z$ is 37.5.

3. The salt of claim 1 wherein $n$ is 4, $x$ is 10, $y$ is 86 and $z$ is 0.

4. The salt of claim 1 wherein $n$ is 8, $x$ is 17, $y$ is 52.5 and $z$ is 22.5.

5. The salt of claim 1 wherein $n$ is 8, $x$ is 17, $y$ is 75 and $z$ is 0.

6. The ammonium salt of the interploymer of 8 weight percent acrylic acid, 17 weight percent N-methylol acrylamide, 37.5 weight percent ethyl acrylate and 37.5 weight percent methyl methacrylate said salt having the property of complete water-solubility in the pH range of from about 6 to about 7.

7. The ammonium salt of the interpolymer of 4 weight percent acrylic acid, 10 weight percent N-methylol acrylamide and 86 weight percent ethyl acrylate said salt having the property of complete water-solubility in the pH range of from about 6 to about 7.

8. The ammonium salt of the interploymer of 8 weight percent acrylic acid, 17 weight percent N-methylol acrylamide and 75 weight percent ethyl acrylate said salt having the property of complete water-solubility in the pH range of from about 6 to about 7.

9. The ammonium salt of the interpolymer of 8 weight percent of acrylic acid, 17 weight percent of N-methylol acrylamide, 52.5 weight percent of ethyl acrylate and 22.5 weight percent of methyl methacrylate said salt having the property of complete water-solubility in the pH range of from about 6 to about 7.

10. The method of preparing an aqueous solution of the salt of the interpolymer conforming to the structure

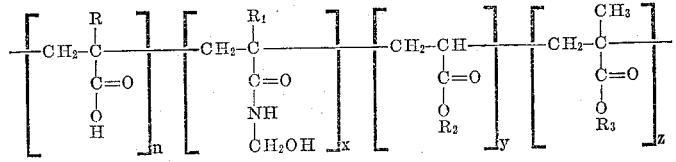

wherein R and $R_1$ are members of the group consisting of hydrogen and methyl; $R_2$ is a member of the group consisting of methyl, ethyl, propyl and butyl; $R_3$ is a member of the group consisting of methyl and ethyl; $n$ represents from 3 to 12 weight percent based on the combined weight of $n$, $x$, $y$ and $z$; $x$ represents from 8 to 25 weight percent based on the combined weight of $n$, $x$, $y$ and $z$; $y$ represents from 45 to 89 weight percent based on the combined weight of $n$, $x$, $y$ and $z$; $z$ represents from 0 to 44 weight percent based on the combined weight of $n$, $x$, $y$ and $z$; the sum of the numerical values of $n+x+y+z$ is always 100 and the groups $n$, $x$, $y$ and $z$ are present in a heterogeneous relative order said method comprising conducting the polymerization in a substantially anhydrous lower aliphatic alcohol in the presence of a free radical polymerization initiator at a temperature of from about 50° C. to about 100° C. until substantially complete conversion is attained followed by the addition of water and a neutralizing agent selected from the group consisting of ammonia, hydrazine, a low boiling primary aliphatic amine and a low boiling secondary aliphatic amine and removing said lower aliphatic alcohol by azeotropic distillation.

11. The method of claim 10 wherein the lower aliphatic alcohol is ethanol and the neutralizing agent is ammonia.

12. The method of claim 10 wherein the lower aliphatic alcohol is isopropanol and the neutralizing agent is ammonia.

13. The method of claim 10 wherein the lower aliphatic alcohol is n-butanol and the neutralizing agent is ammonia.

References Cited in the file of this patent

UNITED STATES PATENTS

| | | |
|---|---|---|
| 2,173,005 | Strain | Sept. 12, 1939 |
| 2,476,527 | Barnes et al. | July 19, 1949 |
| 2,611,763 | Jones | Sept. 23, 1952 |
| 2,653,140 | Allenby et al. | Sept. 22, 1953 |
| 2,680,110 | Loughran et al. | June 1, 1954 |
| 2,718,515 | Thomas | Sept. 20, 1955 |
| 2,861,060 | Goode | Nov. 18, 1958 |
| 2,978,437 | Christenson | Apr. 4, 1961 |

FOREIGN PATENTS

| | | |
|---|---|---|
| 698,193 | Great Britain | Oct. 7, 1953 |

OTHER REFERENCES

Schildknecht: "Vinyl and Related Polymers," pub. 1952 by Wiley, page 321.